R. E. HELLMUND AND L. M. PERKINS.
DYNAMO ELECTRIC MACHINE AND SYSTEM OF CONTROL THEREFOR.
APPLICATION FILED NOV. 16, 1917.
1,379,405. Patented May 24, 1921.
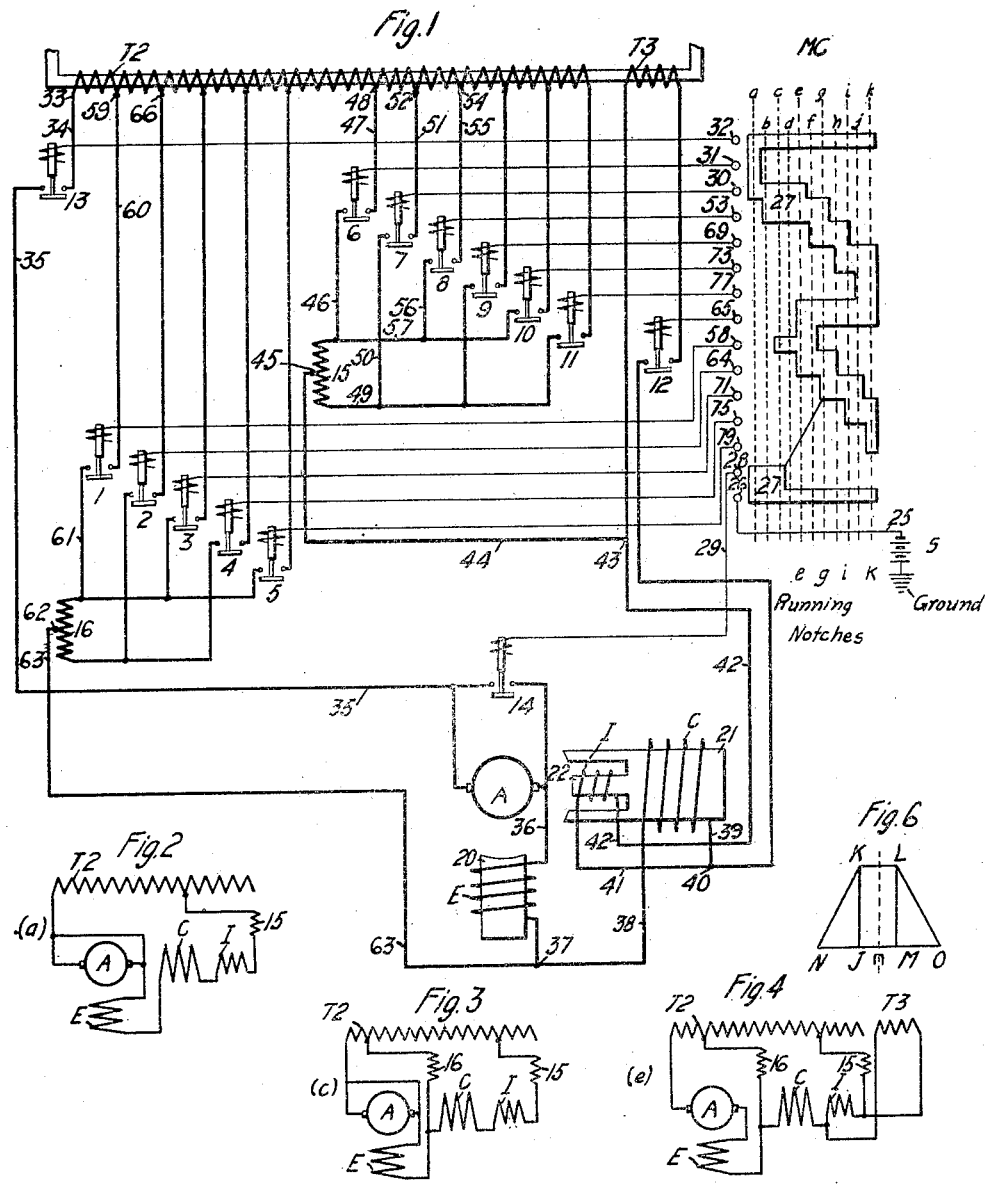
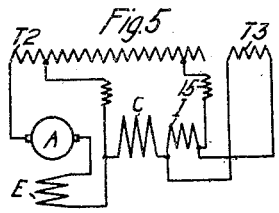
WITNESSES:
INVENTOR
Rudolf E. Hellmund
Laurence M. Perkins.
BY
ATTORNEY

UNITED STATES PATENT OFFICE.

RUDOLF E. HELLMUND AND LAURENCE M. PERKINS, OF SWISSVALE, PENNSYLVANIA, ASSIGNORS TO WESTINGHOUSE ELECTRIC & MANUFACTURING COMPANY, A CORPORATION OF PENNSYLVANIA.

DYNAMO-ELECTRIC MACHINE AND SYSTEM OF CONTROL THEREFOR.

1,379,405.   Specification of Letters Patent.   Patented May 24, 1921.

Application filed November 16, 1917. Serial No. 202,316.

*To all whom it may concern:*

Be it known that we, RUDOLF E. HELLMUND, a citizen of the German Empire, and a resident of Swissvale, in the county of Allegheny and State of Pennsylvania, and LAURENCE M. PERKINS, a citizen of the United States, and a resident of Swissvale, in the county of Allegheny and State of Pennsylvania, have invented a new and useful Improvement in Dynamo-Electric Machines and Systems of Control Therefor, of which the following is a specification.

Our invention relates to dynamo-electric machines and systems of control therefor and especially to the control of single-phase commutator motors of the customary type that are provided with both exciting and inducing field windings.

In the prior-art single-phase commutator motors, which are customarily provided with a single distributed inducing field winding, a rather low power factor obtains during motor operation by reason of the fact that a relatively heavy magnetizing current is required to produce an inducing field flux over substantially the entire polar face of the stator. When a motor is provided with a local commutating-pole winding, such low power-factor conditions may be obviated to a certain extent, but it is commercially impracticable to employ this commutating-pole winding in conjunction with an armature and an exciting field winding in the familiar "doubly-fed" or "transformer-conduction" connection. Consequently, the use of relatively small switches and conductors in the intermediate circuits, which is one of the advantages of such "transformer-conduction" control systems, as set forth, for example, in an article by R. E. Hellmund, appearing on page 390 *et seq.* of "*The Electric Journal*" for October, 1917, is precluded when a local commutating-pole winding alone is employed.

It is the object of our present invention, therefore, to provide single-phase commutator motors wherein the advantages of both a distributed inducing field winding and a local commutating-pole winding may be secured. The desired operation comprises the variable energization of the two portions that together constitute the entire inducing field winding in such manner that, during "permanent-running" conditions, a relatively high power factor obtains in the motor, while, during the "temporary-running" or intermediate conditions, the armature voltage is inductively increased from the inducing field winding to effect a further accelerating step of the motor, as hereinafter more fully set forth.

Our invention may best be understood by reference to the accompanying drawings, wherein Figure 1 is a diagrammatic view of the main and auxiliary circuits of a control system organized in accordance with the present invention; Fig. 2 to Fig. 5, inclusive, are simplified diagrammatic views serving to illustrate various motor-circuit connections during operation; and Fig. 6 is a chart illustrating flux relations in the machine during certain operating intervals thereof.

Referring to Fig. 1 of the drawing, the system shown comprises a suitable derived source of energy, such as a transformer, a secondary winding T2 and an auxiliary secondary winding T3 of which are shown; a single-phase motor comprising a commutator-type armature A, an exciting field winding E and an inducing field winding, having two parts C and I, for purposes to be set forth; a plurality of motor-controlling switches 1 to 14, inclusive, that are governed from a multi-position master controller MC which energizes the various switches from an auxiliary source of energy, such as a storage battery S, in the desired sequence; and a plurality of preventive coils 15 and 16 of a familiar type for preventing short-circuits of sections of the transformer winding.

Although the several illustrated field windings are preferably of the distributed type that is customarily employed in single-phase commutator motors, we have shown the windings in conjunction with salient polar projections to more clearly point out the structural features of our invention. For example, the exciting field winding E is shown as wound upon a polar projection 20, the magnetizing axis of which is located at substantially 90 electrical degrees from the armature magnetizing axis that corresponds to the commutator brushes, while the inducing field winding is illustrated as comprising a large-span compensating coil C that entirely surrounds a polar projection 21 and an interpole or local commutating coil I that is wound upon a small central portion or extension of the main polar projection. The magnetizing axis of the illustrated polar projections for the two parts of the inducing field winding is alined with the armature magnetizing axis that is represented by the line passing through the commutator brushes, in accordance with the usual conventions. The compensating field-coil C is preferably provided with substantially twice the number of turns that the armature has, in accordance with a well-known prior practice.

By reason of the illustrated construction, or its equivalent, in the event that the preferred distributed type of field winding is employed, upon impressing a certain ratio of voltages upon the two parts C and I of the inducing field winding during "permanent-running" conditions, the field form produced by the entire inducing field winding may be represented by the rectangular figure JKLM, of Fig. 6, wherein the central dotted line corresponds to the armature-brush position. The rectangular form of JKLM is produced when the winding I occupies a single slot; under other conditions, the figure will be trapezoidal in shape. Although both coils C and I are energized under such conditions, the localized field form is produced for the following reason. During such "permanent-running" conditions, which correspond to positions $e$, $g$, $i$ and $k$ of the master controller MC, as indicated by the legend "Running notches," the total voltage impressed upon the two parts of the inducing field winding is so chosen that the flux, represented by the figure JKLM, that is set up by the interpole or commutating-pole winding I, induces a voltage within itself and also within the remaining part C of the inducing field winding that, in total, is approximately equal and opposite to the entire impressed voltage. Consequently, the magnetizing current that would normally be carried by the compensating coil C is entirely nullified, so that the coil C carries only neutralizing current, the value of which is sufficient to partially compensate for the armature cross field, while the commutating-pole winding I carries substantially all of the necessary magnetizing current and, in addition, sufficient neutralizing current to complete the desired nullification of the armature cross-field flux.

Under the previous assumption, that the compensating field winding C is designed with substantially twice the number of turns that the armature has, it follows that the right-hand conductor and the intermediate conductor in the "doubly-fed" or "transformer-conduction" connection shown in Fig. 4 and Fig. 5, for example, each carries only one-half of the armature current. In this way, the desired reduction in the size and cost of the switches and leads, corresponding to the conductors just mentioned, is obtained.

On the other hand, by temporarily increasing the voltage impressed upon the compensating coil C from the supply transformer in the "temporary-running" positions intermediate the above-mentioned "permanent-running" positions, the armature voltage may be inductively increased by the familiar transformer action of the compensating field winding, whereby a control step, to cause a certain speed increase of the motor, is provided. During such increased voltage impression upon the compensating coil, the field form produced by the entire inducing field winding is represented by the trapezoidal figure NKLO, which corresponds to the familiar fully-distributed field form that obtains in the prior-art motors, but which, as previously explained, is accompanied by a relatively low power factor. However, since such fully distributed field-form conditions, corresponding to lower power factors, are employed only temporarily, whereas the localized field-form conditions are utilized during the greater part of the motor operation, it follows that the average power factor of the motor system is materially increased over that provided by the former types of single-phase commutator motors.

Thus, it will be seen that we have succeeded in obtaining the various advantages that are inherent in both above-mentioned types of motors, without necessitating an expensive construction or a very complicated control, as will become even more evident from the following detailed description.

Assuming that it is desired to effect acceleration of the illustrated motor, the master controller MC may be moved to its initial operative position $a$, whereupon an auxiliary circuit is established from the positive terminal of the storage battery S through conductor 25, control finger 26, contact member 27 and control finger 28 of the master controller, whence circuit is continued through conductor 29 and the actuating coil of the switch 14 to any suitable negative or return conductor, such as ground, to which the negative terminal of the storage battery S is also connected. In this way, switch 14 is closed to short-circuit the armature terminals and thus provide the familiar "repulsion" starting connection of the motor.

Control fingers 30, 31 and 32 are also energized in position $a$ of the master controller, whereby switches 13, 6 and 7 are likewise closed. Consequently, a main circuit is established from the left-hand terminal 33 of the transformer winding T2 through conductor 34, switch 13, conductor 35, armature A, which is short-circuited by the switch 14, conductor 36, exciting field winding E, junction point 37, conductor 38, compensating field coil C, conductor 39, junction point 40, conductor 41, commutating or interpolar field coil I, conductor 42, junction point 43, conductor 44, mid-tap point 45 of the preventive coil 15, whence one branch circuit is continued through the upper half of the preventive coil, conductor 46, switch 6 and conductor to an intermediate tap point 48 of the secondary transformer winding T2. A further branch circuit is continued from the preventive-coil tap point 45 through the lower half of the preventive coil, conductors 49 and 50, switch 7 and conductor 51 to another intermediate tap point 52 in the secondary transformer winding.

The simplified circuit connections corresponding to position a of the master controller are shown in Fig. 2. During the starting operation of the motor, therefore, the armature A is short circuited while all three of the field coils are connected in series relation through the preventive coil 15 to a certain point in the secondary transformer winding.

Upon actuation of the master controller to its position b, a new control finger 53 is energized, whereby the switch 8 is closed just after the switch 6 has been opened by the disengagement of the corresponding control finger 31 from the master-controller contact segment 27. By properly designing the configuration of the contact segment 27, the various switches that are connected to the same conductors or buses may be prevented from simultaneous closure, which would effect a short-circuit of certain portions of the transformer winding.

The substitution of switch 8 for switch 6 serves to increase the voltage impressed upon the entire motor circuit by connecting another intermediate tap point 54 of the transformer winding through conductor 55, switch 8 and conductors 56 and 57 to the upper terminal of the preventive coil 15 to thus effect a certain further acceleration of the motor.

In transition position c of the master controller, control finger 58 is energized to effect the closure of switch 1, whereby a new main circuit is established from an intermediate tap point 59 near the left-hand terminal of the transformer winding T2 through conductor 60, switch 1, conductor 61, the upper half of the preventive coil 16, mid-tap point 62 thereof, and conductor 63 to the junction point 37 with the exciting field winding E. In this way, a transitional arrangement is established, as illustrated in a simple manner in Fig. 3, whereby it will be observed that the short circuited armature A and the exciting field winding E are connected across a small portion of the transformer secondary winding, while the compensating field coil C and the commutating field coil I are connected in series relation across a relatively large contiguous section of the transformer winding.

In position d, the switch 14 is opened by the disengagement of the corresponding control finger 28 from the contact segment 27 to remove the "repulsion" connection of the armature and effect a straight "transformer-conduction" arrangement of circuits.

In position e, corresponding to simplified Fig. 4, control fingers 64 and 65 are energized to effect the closure of switches 2 and 12, respectively. Another intermediate tap point 66 of the secondary transformer winding is thus connected, through the switch 2 and the lower half of the preventive coil 16, to the intermediate motor lead or conductor 63, thus increasing the voltage impressed upon the circuit of the armature A.

The closure of switch 12 serves to directly connect the auxiliary secondary transformer winding T3 across the interpole or commutating field-winding coil I. The function of the impression of additional voltage from the auxiliary transformer winding T3, or its equivalent, during the "permanent-running" connection or "running notch" e, has already been pointed out.

In position f, the energizing coil of the switch 7 is first deënergized and new control finger 69 is then energized to effect the closure of switch 9. Position f is one of the previously-mentioned "temporary-running" connections, wherein the voltage impressed upon the compensating field coil C is temporarily increased, by the proper manipulation of switches, to correspondingly raise the equivalent armature voltage and thus effect a step of control or, in other words, effect a certain increase of motor speed.

The simplified circuit connections corresponding to position f are illustrated in Fig. 5.

In position g, control finger 58 first disengages the contact segment 27, and control finger 71 is then energized. In this way, switch 1 is opened just prior to the closure of switch 3, whereby a further direct or conductive impression of increased armature voltage is provided to correspondingly increase the motor speed.

The remaining groups of master controller positions h and i, and j and k correspond to the group comprising "temporary-running" position f, and the "permanent-running" position e or g, the arrangement of parts being such that, during the "temporary-running" positions h and j, the voltage impressed upon the compensating field coil C is successively increased for a short time by the closure of switches 10 and 11 and the opening of the preceding switches 8 and 9, respectively, to produce the previously-described fully distributed field form, while the running-notches $i$ and $k$ serve to effect the closure of switches 4 and 5, and the opening of the preceding switches 2 and 3, respectively, to restore normal voltage relations, corresponding to the above-mentioned localized field form.

It will thus be seen that we have provided a relatively simple control system for single-phase commutator-type motors wherein the inherent advantages of the distributed type of inducing field winding, particularly the inductive impression of increased voltages upon the armature, are retained along with the inherent advantages of a localized commutating-pole winding, such as increasing the operating power factor of the motor.

We do not wish to be restricted to the specific circuit connections or arrangement of parts herein set forth, as various modifications thereof may be made without departing from the spirit and scope of our invention. We desire, therefore, that only such limitations shall be imposed as are indicated in the appended claims.

We claim as our invention:

1. In a system of control, the combination with a source of energy and a single-phase commutator motor comprising an armature, an exciting field winding and an inducing field winding having a larger number of turns than said armature and also having a large-span compensating coil and a more localized commutating coil located nearer the armature, of means for impressing voltages from said source upon the inducing-field-winding parts at times in such ratio that one of said parts carries a relatively high proportion of the total "magnetizing" current.

2. In a system of control, the combination with a source of energy and a single-phase commutator motor comprising an armature, an exciting field winding and a plural-part inducing field winding having a larger number of turns than said armature, of means for impressing voltages from said source upon the inducing-field-winding parts at times in such ratio that one of said parts carries substantially only "neutralizing" current while another part carries both "neutralizing" and "magnetizing" currents.

3. In a system of control, the combination with a source of energy and a single-phase commutator motor comprising an armature, an exciting field winding and an inducing field winding having a larger number of turns than said armature and also having a large-span compensating coil and a more localized commutating coil located nearer the armature, of means for energizing the parts of said inducing field winding from said source to provide a localized field form during certain running conditions and to provide a more distributed field form during other running conditions.

4. In a system of control, the combination with a source of energy and a single-phase commutator motor comprising an armature, an exciting field winding and a plural-part inducing field winding having a larger number of turns than said armature, of means for variably energizing the parts of said inducing field winding from said source in such manner that a higher power factor obtains in the motor during certain conditions than during other running conditions.

5. In a system of control, the combination with a source of energy and a single-phase commutator motor comprising an armature, an exciting field winding and a plural-part inducing field winding having a larger number of turns than said armature, of means for variably energizing the parts of said inducing field winding from said source in such manner that one part carries substantially the entire "magnetizing" current during certain running conditions and another part receives an increased voltage to inductively increase the armature voltage during other running conditions.

6. In a system of control, the combination with a source of energy and a single-phase commutator motor comprising an armature, an exciting field winding and an inducing field winding having a large-span compensating coil and a more localized commutating coil, said armature having a materially fewer number of turns than said compensating coil, of means for variably energizing said coils from different portions of said source in such manner that the compensating coil carries substantially only "neutralizing" current while the commutating coil carries both "neutralizing" and "magnetizing" currents.

7. The method of operating a single-phase commutator machine having a distributed field winding and a localized commutating field winding both disposed in an axis different from the exciting axis which consists in energizing said local field winding in such manner as to carry substantially all the "magnetizing" currents and in energizing said distributed field winding in such manner as to carry substantially only "neutralizing" current under normal running conditions, and in varying the energization of said field windings in such manner that the distributed field winding carries a current having a value other than the "neutralizing" current value during transition conditions.

In testimony whereof, we have hereunto subscribed our names this 31st day of Oct. 1917.

RUDOLF E. HELLMUND.
LAURENCE M. PERKINS.